April 5, 1966     K. H. KRECKEL     3,244,963
REGULATED POWER SUPPLY
Filed Nov. 1, 1961
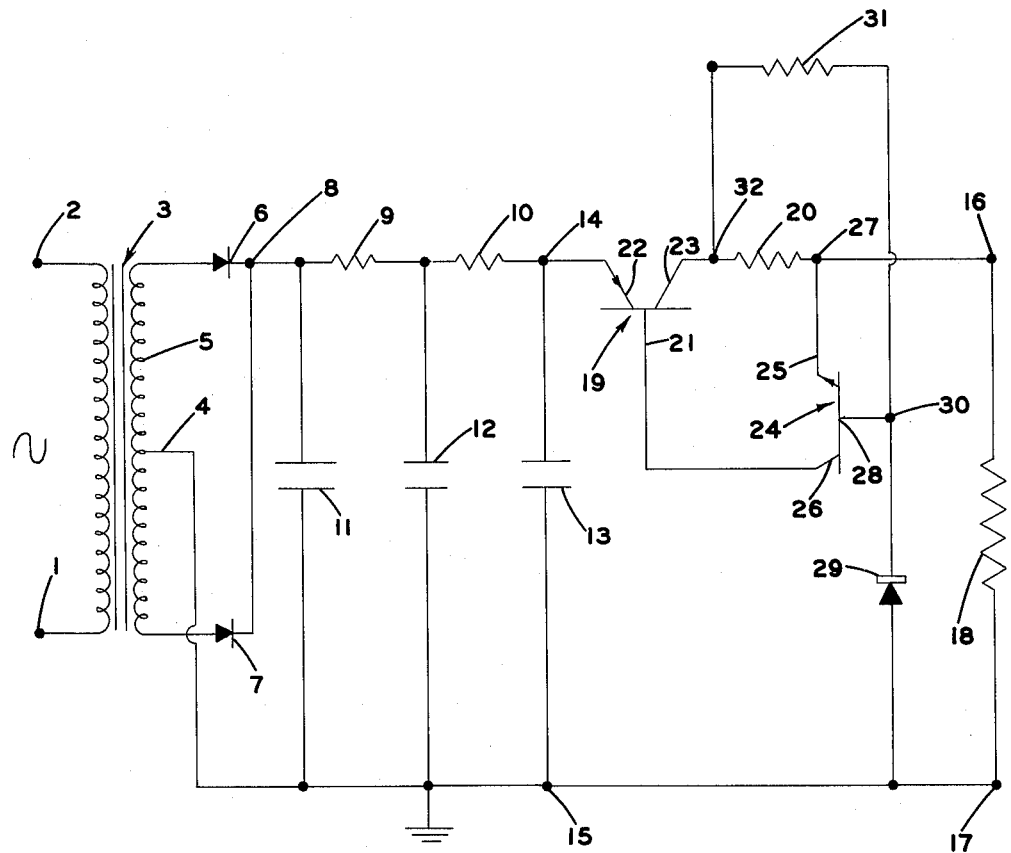
INVENTOR.
KURT H. KRECKEL
BY
ATTORNEYS

United States Patent Office 3,244,963
Patented Apr. 5, 1966

3,244,963
REGULATED POWER SUPPLY
Kurt H. Kreckel, Fairport, N.Y., assignor to Bausch & Lomb Incorporated, Rochester, N.Y., a corporation of New York
Filed Nov. 1, 1961, Ser. No. 149,463
3 Claims. (Cl. 323—22)

This invention relates to a low voltage regulated power supply, and more particularly to a transistorized voltage regulated supply.

For a constant voltage output the regulator means must be sensitive to any voltage variation. Accordingly, this invention provides a low voltage regulated supply having a control means sensing slight voltage variations on the output of the circuit which are transmitted through the amplification of two transistors to compensate for variations in line voltage.

It is an object of this invention to provide a transistorized voltage regulator of high sensitivity to compensate for variations in line voltage.

It is another object of this invention to provide a transistorized voltage regulator including two transistors and two resistors in combination with a reference diode.

The objects of this invention are accomplished by placing a transistor in series with the input filtered voltage, and in series with the first transistor is a low ohm voltage dropping resistor. The first transistor is connected through the voltage dropping resistor to an output terminal.

A second transistor is connected to the base of the first transistor. A Zener diode is connected to the base of the second transistor, and in series with a current-limiting resistor. This circuit provides a double amplification of the two transistors to provide an extremely sensitive circuit sensing voltage variations from the input of the regulator and immediatel compensates to provide a voltage regulation of minimum variation of the output.

The foregoing and other objects of the invention will become apparent from the following detailed description of the representative embodiments illustrated in the drawing.

The schematic drawing illustrates a source of alternating voltage, a filtering circuit, and a transistorized voltage regulator.

Referring to the drawing, the terminals 1 and 2 are connected to a source of alternating voltage. The transformer 3 has a center tap 4 of winding 5 connected to ground potential. The ends of the winding 5 are connected to diodes 6 and 7. The diodes 6 and 7 are connected to the terminal 8.

The terminal 8 connects the rectifier circuit with the filtering circuit, consisting of capacitor 11, resistor 9, capacitor 12, resistor 10 and capacitor 13. The capacitor 11 is connected between the terminal 8 and ground. The connection intermediate resistors 9 and 10 are connected to the capacitor 12, which is connected to ground on its opposite side. The capacitor 13 is connected to ground on one side and the output of the filtering network to terminal 14 on the opposite side.

The terminals 14 and 15 are connected to the input of the regulator circuit. The output terminals 16 and 17 of the voltage regulator circuit are connected to the load resistor 18. Terminals 15 and 17 are at ground potential.

The transistor 19 is a PNP type transistor, and is connected in series with the voltage dropping resistor 20, which in turn is connected to the output terminal 16.

The voltage potential between terminals 14 and 16 is determined by the resistance of voltage dropping resistor 20 and the internal resistance of the transistor 19. The current flow to the base 21 controls the current flow through the emitter 22 and the collector 23, and also the current flow through the voltage dropping resistor 20.

A voltage sensing transistor 24 is connected between the low-voltage side of the voltage dropping resistor 20, and the base 21 of the series transistor 19. The emitter 25 is connected on the low voltage side of resistor 20, and the collector 26 is connected to the base 21 of the transistor 19. The emitter 25 senses a voltage change on the terminal 27.

The transistor 24 is an NPN type transistor. The base 28 of the transistor 24 is connected to Zener diode 29. The Zener diode operates as a reference voltage device, and is connected to ground potential on one side and to the terminal 30 on the opposite side. The Zener diode tends to maintain a constant voltage on the base 28 of the transistor 24. The Zener diode is connected in series with the current limiting resistor 31, which is connected to the terminal 32 intermediate, the collector 23 of transistor 19, and the voltage dropping resistor 20. The Zener diode operates on a range wherein the voltage across the diode remains substantially constant over considerable range of current variations. The diode operates under a low dynamic impedance and it follows that a large change in current through the diode causes a small change in voltage across the Zener diode.

The Zener diode 29 maintains a substantially constant voltage on the terminal 30 while the variations reflected from the input side of the voltage regulator are sensed on the terminal 27 and the emitter 25 of the transistor 24. These voltage variations are amplified through the transistors 24 and 19, which immediately compensate through a change of impedance, and restore the voltage output across terminals 16 and 17 to their normal level.

The operation of the transistorized voltage regulator will be described in the following paragraphs.

The resistors 31 and 20 are of approximately 560 ohms and 1.5 ohms respectively. These values are suggested for illustration only, and the device is not limited to these values. The output voltage is positive with respect to ground. The polarity of the rectifier unit may be reversed by also replacing the PNP transistor with an NPN transistor and vice versa as well as reversing the Zener diode connections to provide the same operation, with the output voltage being negative with respect to ground. The suggested circuit as illustrated is sufficient, however, to set forth the operation of the device.

An unregulated filtered voltage input is received from the filtering network. The voltage variations carry a ripple amplitude sufficiently small to be within the operating range of the series transistor 19. The transistor 19 operates as a variable impedance in series with the load circuit. This transistor may be paralleled with a resistor which would relieve the power requirements of the transistor. This resistor is, however, not shown in the illustration, as it is not necessary in describing the operation of the circuit. The series transistor 19 is followed by the series voltage dropping resistor 20, which, together with resistor 31, sets the operating current of the low power Zener diode 29. Any voltage change across the output terminals 16 and 17 owing to the voltage change across the input terminals 14 and 15 will change the voltage across base 28 and emitter 25 of the transistor 24. The Zener diode 29 maintains a substantially constant voltage on the terminal 30, which is connected to the base 28 of the transistor 24. With the change in the base emitter voltage, the collector 26 of transistor 24 will also change. The collector 26 is connected to the base 21 of the series transistor 19. The change in collector current of the transistor 24 will change the base current in transistor 19 to change the internal resistance of the transistor 19. The change of the transistor internal resistance of the transistor 19 changes the voltage across the transistor, which compensates for the change in output voltage and brings the output voltage back to essentially its original value.

The current through the Zener diode 29 and resistor 31 is substantially constant. Although a voltage change is realized on the terminal 32, the voltage change is slight, and the current flowing through the resistor and the Zener diode is substantially constant. The current flowing through the Zener diode to the base 28 of the transistor 24 is small. Considering that a slight voltage change on the Zener diode 29 will permit wide variations of current, with the current being substantially constant the diode voltage remains constant. A voltage change on input terminals, due to a line variation is reflected on the output terminals. This voltage change on terminals 32 and 27 is immediately sensed by the transistor 24. With a drop in the voltage on the terminal 27, the current flow in the transistor 24 increases. The collector 26 on transistor 24 is connected to the base 21, of the series transistor 19. An increase in base current of transistor 19 decreases the impedance of the transistor 19. The change in the impedance of the transistor 19 operates to reduce the voltage change in the circuit.

It is understood that the above-described arrangement is illustrative and descriptive in setting forth the invention covered herein. Other modifications illustrating and describing this invention may be devised without departing from the spirit of the invention.

The following attached claims are considered to cover the invention as described above.

What is claimed is:

1. A voltage regulator circuit comprising a variable impedance transistor and a voltage dropping resistor serially connected between an input terminal and an output terminal of the regulator circuit, biasing means for controlling the base voltage of said variable impedance transistor including a Zener diode connected to a neutral potential and serially connected in reverse bias through a current limiting resistor to a junction connecting said variable impedance transistor and said voltage dropping resistor, a voltage sensing transistor connected between said output terminal and the base of said variable impedance transistor to control the impedance of said variable impedance transistor, a junction intermediate said diode and said current limiting resistor connected to the base of said voltage sensing transistor for maintaining a substantially constant voltage on the base of said voltage sensing transistor, said voltage sensing transistor thereby sensing voltage variations across the voltage dropping resistor and varying the base current of the variable impedance transistor for regulating the voltage output from said regulator circuit.

2. A voltage regulator circuit comprising a variable impedance transistor serially connected with a voltage dropping resistor between an input terminal and an output terminal of the voltage regulator circuit, a biasing means for controlling the base voltage of said variable impedance transistor including a voltage sensing transistor connected between the output terminal and the base of said variable impedance transistor, a reverse bias Zener diode connected between a neutral potential and the base of said voltage sensing transistor and connected through a current limiting resistor to the junction intermediate said variable impedance transistor and said voltage dropping resistor for providing a substantially constant voltage at the base of said voltage sensing transistor, said voltage sensing transistor sensing a voltage change across its emitter and base connections and thereby controlling the base current of said variable impedance transistor to provide substantially constant voltage from the output of said voltage regulator circuit.

3. A voltage regulator circuit comprising a variable impedance transistor and a voltage dropping resistor serially connecting between an input terminal and an output terminal of the regulator circuit, a Zener diode and a current limiting resistor serially connected between the junction of said variable impedance transistor and of said voltage dropping resistor and a neutral potential, a voltage sensing transistor having its collector connected to the base of said variable impedance transistor and its emitter connected to the output terminal, means connecting the base of said voltage sensing transistor to the junction intermediate said Zener diode and said current limiting resistor to cause said voltage sensing transistor to sense variations in voltage across the voltage dropping resistor to thereby vary the voltage on the base of said variable impedance transistor to provide regulated voltage output on the circuit.

References Cited by the Examiner

UNITED STATES PATENTS

| | | | |
|---|---|---|---|
| 2,767,330 | 10/1956 | Marshall | 323—22 |
| 2,888,632 | 5/1959 | Livezey | 323—22 |
| 2,888,633 | 5/1959 | Carter | 323—9 |
| 2,896,151 | 7/1959 | Zelinka | 323—22 |
| 2,912,635 | 11/1959 | Moore | 322—25 |
| 3,049,632 | 8/1962 | Staples | 307—88.5 |
| 3,078,410 | 2/1963 | Thomas | 323—22 |
| 3,100,863 | 8/1963 | McCullough | 323—22 |
| 3,109,980 | 11/1963 | Wiley | 323—22 |
| 3,113,260 | 12/1963 | Wiley | 323—4 |
| 3,123,759 | 3/1964 | Grey | 320—40 |

MILTON O. HIRSHFIELD, *Primary Examiner.*

LLOYD McCOLLUM, *Examiner.*